United States Patent
Xia

(10) Patent No.: US 12,314,624 B2
(45) Date of Patent: May 27, 2025

(54) IMAGE QUALITY ADJUSTMENT METHOD AND APPARATUS

(71) Applicant: Huawei Technologies Co., Ltd., Shenzhen (CN)

(72) Inventor: Yonglin Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 165 days.

(21) Appl. No.: 18/308,761

(22) Filed: Apr. 28, 2023

(65) Prior Publication Data

US 2023/0259320 A1    Aug. 17, 2023

Related U.S. Application Data

(63) Continuation of application No. PCT/CN2021/123622, filed on Oct. 13, 2021.

(30) Foreign Application Priority Data

Oct. 31, 2020  (CN) .......................... 202011195639.1

(51) Int. Cl.
| | |
|---|---|
| G06F 3/00 | (2006.01) |
| G06F 3/14 | (2006.01) |
| G06T 7/00 | (2017.01) |
| G06T 7/90 | (2017.01) |

(52) U.S. Cl.
CPC .......... *G06F 3/1446* (2013.01); *G06T 7/0002* (2013.01); *G06T 7/90* (2017.01); *G06T 2207/10024* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 2002/0171810 | A1* | 11/2002 | Tegreene | G03B 21/28 353/30 |
| 2003/0103162 | A1* | 6/2003 | Sano | H04N 9/3147 348/383 |
| 2004/0008288 | A1* | 1/2004 | Pate | H04N 9/3182 348/742 |

(Continued)

FOREIGN PATENT DOCUMENTS

| | | |
|---|---|---|
| CN | 104795048 A | 7/2015 |
| CN | 107274848 A | 10/2017 |

*Primary Examiner* — Martin Mushambo
(74) *Attorney, Agent, or Firm* — Slater Matsil, LLP

(57) ABSTRACT

A method includes: receiving a first event, where the first event is used to trigger image quality adjustment of a splicing display; sending N reference pictures including a first reference picture to the splicing display in response to the first event; receiving a first photo obtained by photographing an entire display area of the splicing display when the splicing display displays the first reference picture in full screen as a whole; and generating a first image quality adjustment parameter and a second image quality adjustment parameter based on the first reference picture and the first photo, where the first image quality adjustment parameter and the second image quality adjustment parameter is used to adjust image quality of the first and second display respectively.

20 Claims, 4 Drawing Sheets

(56) References Cited

U.S. PATENT DOCUMENTS

| | | | |
|---|---|---|---|
| 2007/0071318 A1* | 3/2007 | Yamashita | G06T 5/40 |
| | | | 382/169 |
| 2007/0188623 A1* | 8/2007 | Yamashita | G06T 5/40 |
| | | | 348/222.1 |
| 2011/0234922 A1* | 9/2011 | Nelson | H04N 9/3185 |
| | | | 348/E3.048 |
| 2015/0138440 A1* | 5/2015 | Ueda | H04N 9/3105 |
| | | | 348/642 |
| 2020/0035195 A1 | 1/2020 | Maeng et al. | |
| 2020/0184905 A1* | 6/2020 | Park | G09G 3/342 |

* cited by examiner

IMAGE QUALITY ADJUSTMENT METHOD AND APPARATUS

CROSS-REFERENCE TO RELATED APPLICATIONS

This application is a continuation of International Application No. PCT/CN2021/123622, filed on Oct. 13, 2021, which claims priority to Chinese Patent Application No. 202011195639.1, filed on Oct. 31, 2020. The disclosures of the aforementioned applications are hereby incorporated by reference in their entireties.

TECHNICAL FIELD

This application relates to the field of terminal display technologies, and in particular, to an image quality adjustment method and an apparatus.

BACKGROUND

At present, a plurality of small-sized displays may be spliced into one large-sized display, to provide visual experience of large-screen display effect for a user. However, a difference in display effect of the small-sized displays easily leads to poor display effect of the spliced large-sized display, especially at a joint position of the small-sized displays, thereby affecting user's viewing.

SUMMARY

This application provides an image quality adjustment method and an apparatus, to support adjusting image quality of a plurality of displays in a splicing display at a time, thereby helping improve image quality adjustment efficiency of the splicing display.

According to a first aspect, an embodiment of this application provides an image quality adjustment method, specifically including: receiving a first event, where the first event is used to trigger image quality adjustment of a splicing display, and the splicing display is a display that is obtained by combining at least a first display and a second display; sending N reference pictures to the splicing display in response to the first event, where the N reference pictures includes a first reference picture, and N is a positive integer greater than or equal to 1; receiving a first photo, where the first photo is a photo obtained by photographing an entire display area of the splicing display when the splicing display displays the first reference picture in full screen as a whole; and generating a first image quality adjustment parameter and a second image quality adjustment parameter based on the first reference picture and the first photo, where the first image quality adjustment parameter is used to adjust image quality of the first display, and the second image quality adjustment parameter is used to adjust image quality of the second display.

In this embodiment of this application, when image quality adjustment of the splicing display is triggered, N reference pictures can be sent to the splicing display, so that an image quality adjustment parameter can be generated for each display of the splicing display based on the reference picture and the shot photo of the entire display area of the splicing display when the splicing display displays the reference picture in full screen. Therefore, compared with the conventional technology in which a user needs to separately adjust image quality of each display of the splicing display, this can adjust image quality of a plurality of displays of the splicing display a time, so that efficiency of image quality adjustment of the splicing display can be improved.

In a possible design, the first image quality adjustment parameter and the second image quality adjustment parameter may be generated based on the first reference picture and the first photo in the following manner:

dividing the first photo into a first image and a second image, where the first image is an image displayed on the first display when the splicing display displays the first reference picture in full screen as a whole, and the second image is an image displayed on the second display when the splicing display displays the first reference picture in full screen as a whole;

determining a first image color value, a second image color value, a first boundary color value, and a second boundary color value, where the first image color value is used to indicate an overall color of the first image, the second image color value is used to indicate an overall color of the second image, the first boundary color value is used to indicate a color value of a first boundary in the first image, the second boundary color value is used to indicate a color value of a second boundary in the second image, and the first boundary and the second boundary are adjacent boundaries of the first image and the second image;

adjusting the first image color value and the second image color value based on the first image color value, the second image color value, the first boundary color value, and the second boundary color value, so that after the first image color value and the second image color value are adjusted, a difference between an adjusted first image color value and an adjusted second image color value is less than a first threshold, a difference between color values of the adjacent boundaries of the first image and the second image is less than a second threshold, and a difference between a color value of the entire display area of the splicing display and a color value of the first reference picture is less than a third threshold; and obtaining the first image quality adjustment parameter based on the color value of the first reference picture and the adjusted first image color value, and obtaining the second image quality adjustment parameter based on the color value of the first reference picture and the adjusted second image color value.

According to the foregoing technical solution, after different displays of the splicing display are adjusted based on a corresponding image quality adjustment parameter, overall display effect of the splicing display is more coordinated.

In a possible design, the first image quality adjustment parameter includes an RGB value of the first reference picture and a first target RGB value, and the first target RGB value is obtained based on the adjusted first image color value. The second image quality adjustment parameter includes the RGB value of the first reference picture and a second target RGB value, and the second target RGB value is obtained based on the adjusted second image color value. This is easy to implement.

It should be noted that the RGB value of the reference picture may also be referred to as a standard RGB value. For example, when the reference picture is a pure red picture, the RGB value of the reference picture is a pure red RGB value.

In a possible design, the first image color value is an average value of color values of all image blocks in the first image, the second image color value is an average value of color values of all image blocks in the second image, the first boundary color value is an average value of color values of all image blocks on the first boundary, and the second boundary color value is an average value of color values of all image blocks on the second boundary. In this way, a color value used to measure an overall color of an image and a color value used to measure a color of a specific boundary of the image are more practical.

In a possible design, the first image color value and the second image color value may be adjusted based on the first image color value, the second image color value, the first boundary color value, and the second boundary color value in the following manner:

selecting a smaller value in the first image color value and the second image color value;

when the first image color value is less than the second image color value, determining whether a difference between the second image color value and the first image color value is less than the first threshold, and determining whether a difference between the second boundary color value and the first boundary color is less than the second threshold;

if the difference between the second image color value and the first image color value is less than the first threshold, and the difference between the second boundary color value and the first boundary color is less than the second threshold, determining whether the difference between the color value of the entire display area of the splicing display and the color value of the first reference picture is less than the third threshold; and if the difference between the color value of the entire display area of the splicing display and the color value of the first reference picture is not less than the third threshold, adjusting the first image color value based on a first step size, and re-executing the step of selecting a smaller value in the first image color value and the second image color value, until the difference between the color value of the entire display area of the splicing display and the color value of the first reference picture is less than the third threshold.

In this way, after different displays of the splicing display are adjusted based on a corresponding image quality adjustment parameter, overall display effect of the splicing display is more coordinated.

It should be understood that, for a splicing display formed by splicing three or more displays, a minimum value of an image color value of each display is selected.

In a possible design, the method further includes: if the difference between the second image color value and the first image color value is not less than the first threshold, and/or the difference between the second boundary color value and the first boundary color is not less than the second threshold, adjusting the second image color value based on a second step size, and re-executing the step of selecting a smaller value in the first image color value and the second image color value. In this way, after different displays of the splicing display are adjusted based on a corresponding image quality adjustment parameter, overall display effect of the splicing display is optimal, instead of display effect of a single display.

In a possible design, the method further includes: sending the first image quality adjustment parameter to the first display, so that the first display adjusts image quality based on the first image quality adjustment parameter; and sending the second image quality adjustment parameter to the second display, so that the second display adjusts image quality based on the second image quality adjustment parameter. In this way, image quality of each display of the splicing display can be adjusted.

In a possible design, N is 64 or 125. For example, when N is 64, the 64 reference pictures are different, so that a plurality of groups of image quality adjustment parameters are obtained for different displays of the splicing display.

In a possible design, the first reference picture is a standard-color picture or a standard-color-gradation picture. In this way, reliability of the obtained image quality adjustment parameter is improved.

In a possible design, the first event is a first startup operation, an image quality adjustment operation, or arrival of an image quality adjustment moment. In this way, the display effect of the splicing display is maintained, and user experience is improved.

In a possible design, the method further includes: in response to the first event, generating the N reference pictures, and sending the N reference pictures to the splicing display. For example, the N reference pictures may be obtained based on a corresponding reference picture generation algorithm.

According to a second aspect, an embodiment of this application provides an apparatus, including a processing module and a communication module.

The communication module is configured to receive a first event, where the first event is used to trigger image quality adjustment of a splicing display, and the splicing display is a display that is obtained by combining at least a first display and a second display.

The processing module is configured to trigger, in response to the first event, the communication module to send N reference pictures to the splicing display, where the N reference pictures include a first reference picture, and N is a positive integer greater than or equal to 1.

The communication module is further configured to receive a first photo, where the first photo is a photo obtained by photographing an entire display area of the splicing display when the splicing display displays the first reference picture in full screen as a whole.

The processing module is further configured to generate a first image quality adjustment parameter and a second image quality adjustment parameter based on the first reference picture and the first photo, where the first image quality adjustment parameter is used to adjust image quality of the first display, and the second image quality adjustment parameter is used to adjust image quality of the second display.

In a possible design, the processing module is configured to generate the first image quality adjustment parameter and the second image quality adjustment parameter based on the first reference picture and the first photo in the following manner:

The processing module first divides the first photo into a first image and a second image, where the first image is an image displayed on the first display when the splicing display displays the first reference picture in full screen as a whole, and the second image is an image displayed on the second display when the splicing display displays the first reference picture in full screen as a whole.

The processing module determines a first image color value, a second image color value, a first boundary color value, and a second boundary color value, where the first image color value is used to indicate an overall color of the first image, the second image color value is used to indicate an overall color of the second image, the first boundary color value is used to indicate a color value of a first boundary in the first image, the second boundary color value is used to indicate a color value of a second boundary in the second image, and the first boundary and the second boundary are adjacent boundaries of the first image and the second image.

The processing module adjusts the first image color value and the second image color value based on the first image color value, the second image color value, the first boundary color value, and the second boundary color value, so that after the first image color value and the second image color value are adjusted, a difference between an adjusted first image color value and an adjusted second image color value is less than a first threshold, a difference between color values of the adjacent boundaries of the first image and the second image is less than a second threshold, and a difference between a color value of the entire display area of the splicing display and a color value of the first reference picture is less than a third threshold.

Finally, the processing module obtains the first image quality adjustment parameter based on the color value of the first reference picture and the adjusted first image color value, and obtains the second image quality adjustment parameter based on the color value of the first reference picture and the adjusted second image color value.

In a possible design, the first image quality adjustment parameter includes an RGB value of the first reference picture and a first target RGB value, and the first target RGB value is obtained based on the adjusted first image color value. The second image quality adjustment parameter includes the RGB value of the first reference picture and a second target RGB value, and the second target RGB value is obtained based on the adjusted second image color value.

In a possible design, the first image color value is an average value of color values of all image blocks in the first image, the second image color value is an average value of color values of all image blocks in the second image, the first boundary color value is an average value of color values of all image blocks on the first boundary, and the second boundary color value is an average value of color values of all image blocks on the second boundary.

In a possible design, the processing module is configured to adjust the first image color value and the second image color value based on the first image color value, the second image color value, the first boundary color value, and the second boundary color value in the following manner:

The processing module first selects a smaller value in the first image color value and the second image color value.

Then, when the first image color value is less than the second image color value, the processing module determines whether a difference between the second image color value and the first image color value is less than the first threshold, and determines whether a difference between the second boundary color value and the first boundary color is less than the second threshold.

If the difference between the second image color value and the first image color value is less than the first threshold, and the difference between the second boundary color value and the first boundary color is less than the second threshold, the processing module determines whether the difference between the color value of the entire display area of the splicing display and the color value of the first reference picture is less than the third threshold.

If the difference between the color value of the entire display area of the splicing display and the color value of the first reference picture is not less than the third threshold, the processing module adjusts the first image color value based on a first step size, and re-executes the step of selecting a smaller value in the first image color value and the second image color value, until the difference between the color value of the entire display area of the splicing display and the color value of the first reference picture is less than the third threshold.

In a possible design, the processing module is further configured to: if the difference between the second image color value and the first image color value is not less than the first threshold, and/or the difference between the second boundary color value and the first boundary color is not less than the second threshold, adjust the second image color value based on a second step size, and re-execute the step of selecting a smaller value in the first image color value and the second image color value.

In a possible design, the communication module is further configured to: send the first image quality adjustment parameter to the first display, so that the first display adjusts image quality based on the first image quality adjustment parameter; and send the second image quality adjustment parameter to the second display, so that the second display adjusts image quality based on the second image quality adjustment parameter.

In a possible design, N is 64 or 125.

In a possible design, the first reference picture is a standard-color picture or a standard-color-gradation picture.

In a possible design, the first event is a first startup operation, an image quality adjustment operation, or arrival of an image quality adjustment moment.

In a possible design, the apparatus is a device separated from the splicing display, or the apparatus is a chip integrated on the splicing display.

According to a third aspect, an embodiment of this application provides an apparatus. The apparatus includes a memory, a processor, and a communication interface. The memory stores one or more computer programs, the one or more computer programs include instructions, and the processor is configured to execute the instructions to invoke the communication interface, so that the apparatus performs the method according to any one of the first aspect and the possible designs of the first aspect.

The memory, the processor, and the communication interface are coupled. In this embodiment of this application, "coupling" means that two components are directly or indirectly combined with each other.

In a possible design, the apparatus is a host and is separated from a splicing display. Alternatively, the apparatus is a chip, and is integrated on the splicing display.

According to a fourth aspect, an embodiment of this application provides a computer-readable storage medium. The computer-readable storage medium includes a computer program. When the computer program is run on an electronic device, the electronic device is enabled to perform the method according to any one of the first aspect and the possible designs of the first aspect.

According to a fifth aspect, an embodiment of this application provides a computer program. The computer program includes instructions. When the instructions are run on a computer, the computer is enabled to perform the method according to any one of the first aspect and the possible designs of the first aspect.

According to a sixth aspect, a system according to an embodiment of this application includes a host, a splicing display, and a color analyzer. The host is configured to perform the method according to any one of the first aspect and the possible designs of the first aspect. The splicing display is configured to receive a reference picture from the host, and display the reference picture in full screen as a whole. Each display in the splicing display receives an image quality adjustment parameter from the host, and performs image quality adjustment based on the corresponding image quality adjustment parameter. The color analyzer is used to photograph an entire display area of the splicing display when the splicing display displays a reference picture in full screen as a whole, and send the photo to the host.

For beneficial effect of the second aspect to the sixth aspect, refer to the beneficial effect of the first aspect. Details are not described again.

DETAILED DESCRIPTION OF ILLUSTRATIVE EMBODIMENTS

Figure 1:
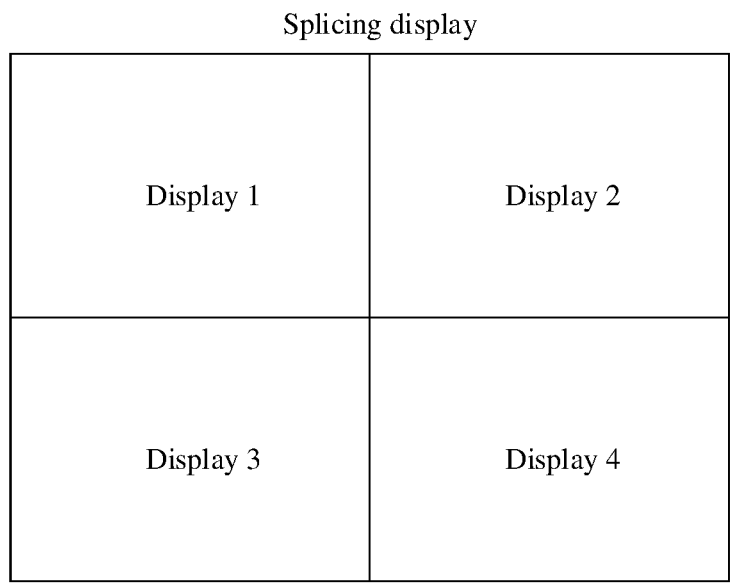
FIG. 1 is a schematic diagram of a splicing display according to an embodiment of this application.

Currently, costs of manufacturing a large-sized display are high. Generally, a plurality of small-sized displays are spliced or combined to obtain a large-sized display. For example, as shown in FIG. 1, a display 1, a display 2, a display 3, and a display 4 are combined to obtain a splicing display, namely, a large-sized display.

However, a difference in display effect of the small-sized displays easily leads to poor display effect of the spliced large-sized display, especially at a joint position of the small-sized displays. Currently, to improve the display effect of the spliced large-sized display, a person skilled in the art generally adjusts image quality of each small-sized display separately. However, this adjustment manner is complex and inefficient.

In view of this, an embodiment of this application provides an image quality adjustment method, to support adjusting image quality of a plurality of displays at a time, thereby helping improve adjustment efficiency. It should be noted that, in this embodiment of this application, image quality is quality of images, and may include an indicator used to measure image quality, such as a color, color accuracy, definition, saturation, brightness, or contrast. Therefore, adjusting image quality of the display may include adjusting an indicator used to measure image quality, such as a color, color accuracy, definition, saturation, or contrast of the display. The following uses adjusting the color of the display as an example.

It should be understood that "at least one" in embodiments of this application refers to one or more. "A plurality of" refers to two or more than two. "And/or" describes an association relationship between associated objects, and indicates that three relationships may exist. For example, A and/or B may represent the following three cases: Only A exists, both A and B exist, and only B exists. A and B may be singular or plural. A character "/" generally indicates an "or" relationship between the associated objects. "At least one of the following pieces (items)" or a similar expression thereof indicates any combination of these items, including a single item (piece) or any combination of a plurality of items (pieces). For example, at least one of a, b, or c may represent seven cases: a, b, c, a and b, a and c, b and c, and a, b and c. Each of a, b, and c may be an element, or may be a set including one or more elements.

In this application, "example", "in some embodiments", "in some other embodiments", or the like is used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

It should be noted that, in embodiments of this application, terms such as "first" and "second" are only used for a purpose of distinction in description, and should not be understood as an indication or implication of relative importance or an indication or implication of a sequence.

Some terms in embodiments of this application are explained first, to facilitate understanding of a person skilled in the art.

1. Display: The display in embodiments of this application is a screen without splicing, for example, the display 1, the display 2, the display 3, or the display 4 shown in FIG. 1.

2. Splicing display: The splicing display in embodiments of this application may also be referred to as a combined screen, and is a screen obtained by splicing or combining a plurality of displays. For example, in FIG. 1, the splicing display is obtained by combining the display 1, the display 2, the display 3, and the display 4.

3. Reference picture: In embodiments of this application, the reference picture has a single color, and is a pure-color picture. For example, the reference picture is red, green, blue, or the like. For example, the reference picture may be a standard-color picture, a standard-color-gradation picture, or the like.

Figure 2:
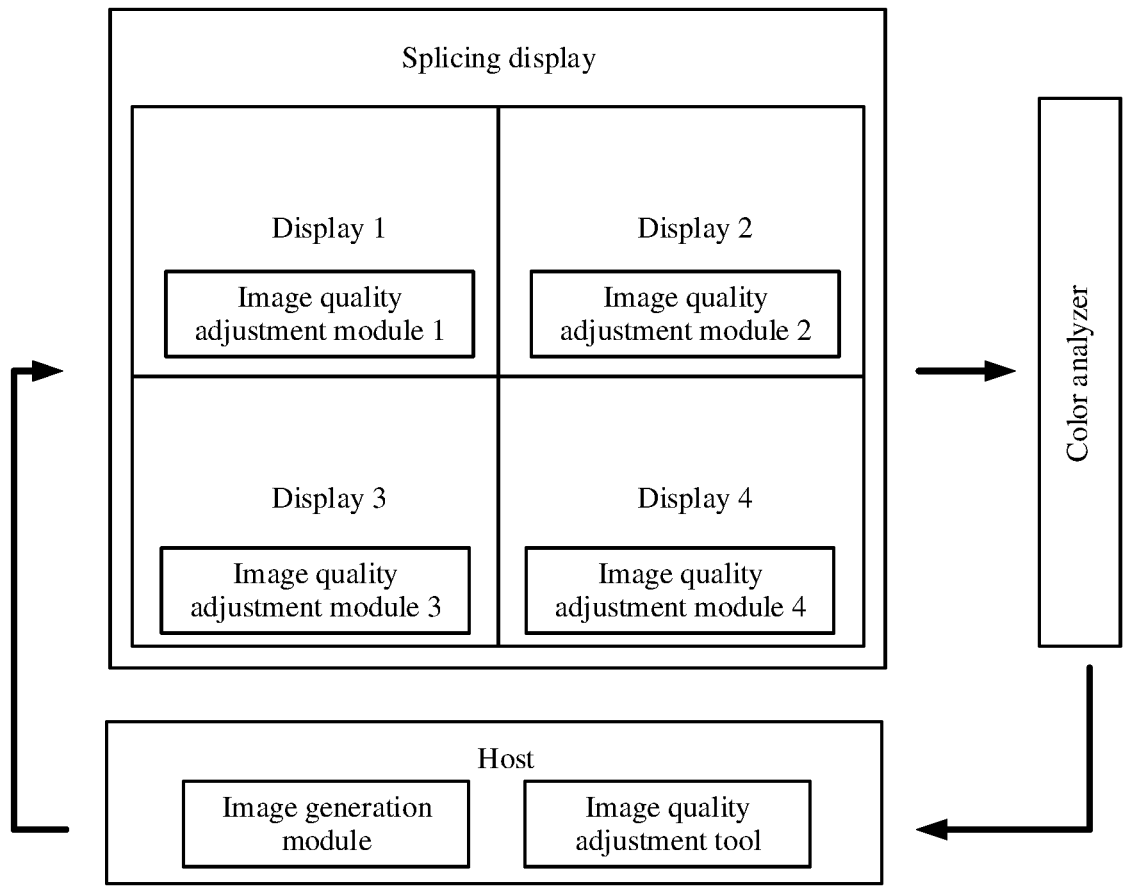
FIG. 2 is a schematic diagram of a system structure according to an embodiment of this application.

The splicing display shown in FIG. 1 is used as an example. For example, FIG. 2 is a diagram of a system architecture according to an embodiment of this application, where a splicing display, a host, and a color analyzer are included. The host and the splicing display may be separated, or the host and the splicing display may not be separated. This is not limited herein.

As shown in FIG. 2, the splicing display includes a display 1, a display 2, a display 3, and a display 4. The display 1 includes an image quality adjustment module 1, the display 2 includes an image quality adjustment module 2, the display 3 includes an image quality adjustment module 3, and the display 4 includes an image quality adjustment module 4. The image quality adjustment module 1 is configured to adjust image quality of the display 1, the image quality adjustment module 2 is configured to adjust image quality of the display 2, the image quality adjustment module 3 is configured to adjust image quality of the display 3, and the image quality adjustment module 4 is configured to adjust image quality of the display 4.

The host is configured to send a group of reference pictures to the splicing display, generate a 3D-Look Up Table (LUT) color adjustment table of each display of the splicing display, and send the 3D-LUT color adjustment table of each display to the corresponding display. A 3D-LUT color adjustment table of a display is used as an example. The 3D-LUT color adjustment table includes a group of image quality adjustment parameters. A quantity of one group of image quality adjustment parameters is the same as a quantity of one group of reference pictures. For example, the quantity of the group of reference pictures is N, and the quantity of the group of image quality adjustment parameters is N. N is a positive integer greater than or equal to 1. For example, a value of N may be 64, 125, or the like.

For example, the host sends a group of reference pictures to the splicing display in response to a startup operation. For example, after a user assembles the splicing display, the host sends a group of reference pictures to the splicing display in response to a first startup operation. For another example, the host receives an operation of adjusting image quality of a display by a user, and sends a group of reference pictures to the splicing display.

For example, the host includes an image generation module and an image quality adjustment tool. The image generation module is configured to send a group of reference pictures to the splicing display. For example, one group of reference pictures may include N reference pictures, where N is a positive integer greater than or equal to 1. For example, the reference picture may be generated by the image generation module, or may be preset in the image generation module. This is not limited herein. The image quality adjustment tool is used to generate the 3D-LUT color adjustment table of each display of the splicing display.

Figure 3:
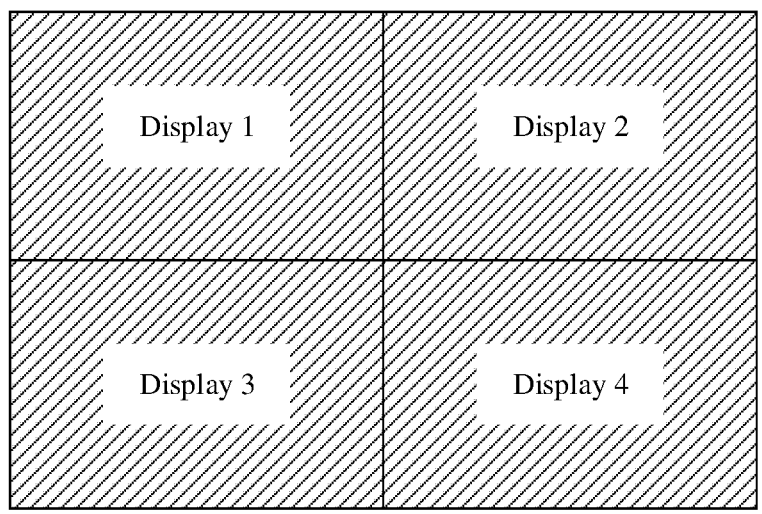
FIG. 3 is a schematic diagram of an entire display area of a splicing display according to an embodiment of this application.

The color analyzer is configured to photograph an entire display area at a fixed position when the splicing display displays a reference picture in full screen, to obtain a photo when the splicing display displays the reference picture in full screen, and send the photo to the host, so as to generate an image quality adjustment parameter. For example, as shown in FIG. 3, that the splicing display displays the reference picture in full screen may be understood as that the splicing display displays the reference picture in the entire display area (namely, a shadow area shown in the figure), that is, the splicing display displays the reference picture as a whole, instead of displaying the reference picture in full screen on each display screen. For example, if the reference picture is a standard blue picture, the shadow area shown in FIG. 3 is blue. The color analyzer photographs the entire display area (namely, the shadow area) of the splicing display shown in FIG. 3.

For example, the color analyzer may be a professional instrument, or may be implemented by using a photographing mobile phone and color analysis software. A specific implementation of the color analyzer is not limited in this embodiment of this application.

It should be noted that, in a case in which the host and the splicing display are separated, the host and the splicing display may be connected in a wired manner or in a wireless manner, which is not limited herein. The host and the color analyzer may also be connected in a wired manner or in a wireless manner, which is not limited herein.

With reference to the system architecture shown in FIG. 2, the following describes in detail an image quality adjustment method in this embodiment of this application by using an example in which one group of reference pictures includes two reference pictures.

Figure 4:
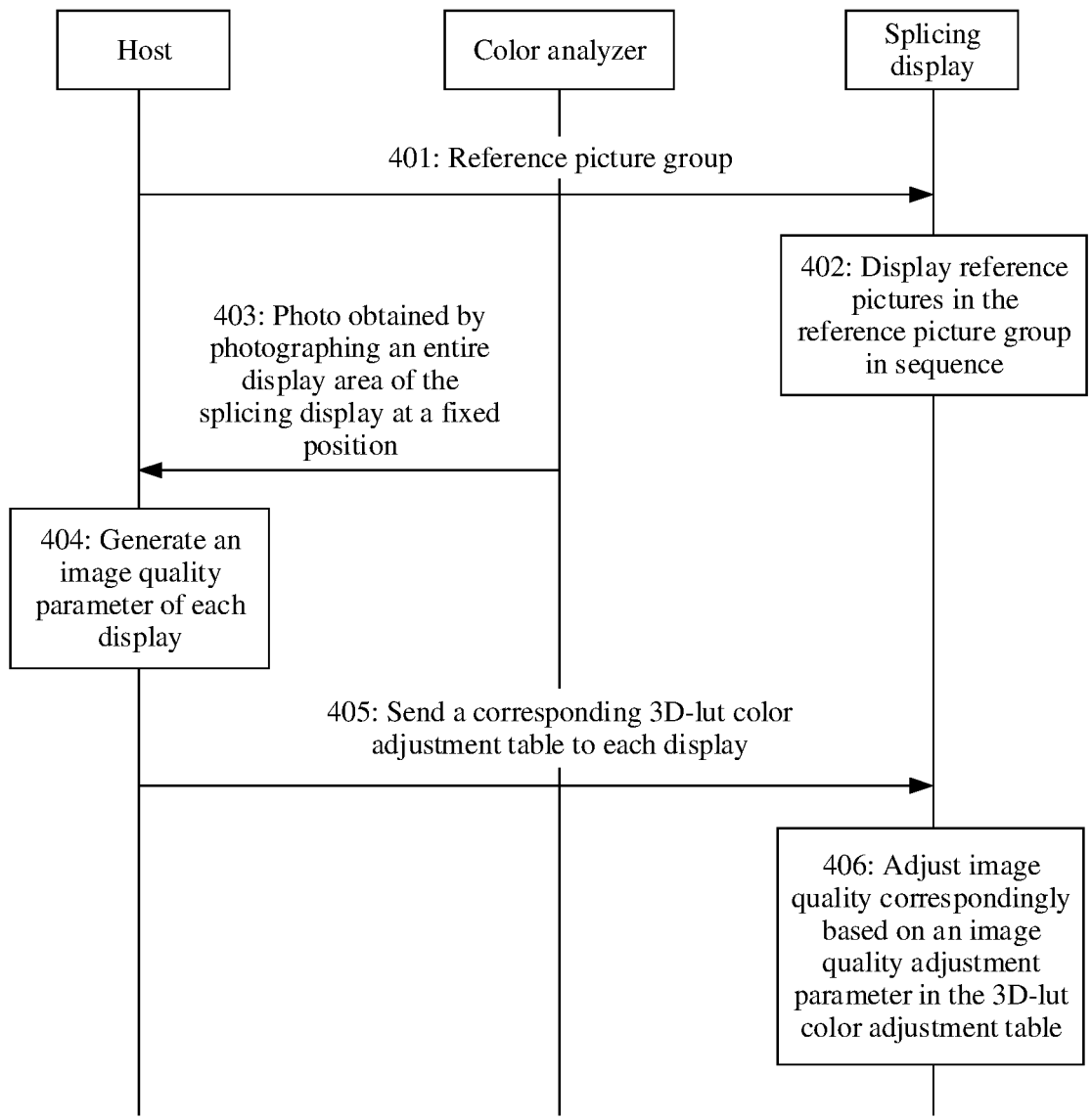
FIG. 4 is a schematic flowchart of an image quality adjustment method according to an embodiment of this application.

For example, FIG. 4 is a schematic flowchart of an image quality adjustment method according to an embodiment of this application. The method specifically includes the following steps.

401: A host sends a reference picture group to a splicing display. The reference picture group is a group of reference pictures. For example, the reference picture group includes a reference picture 1 and a reference picture 2.

For example, in response to a first event, the host may send the reference picture group to the splicing display. For example, the first event may be a startup operation or an operation of adjusting image quality of a display. For another example, the host may alternatively send the reference picture group to the splicing display periodically to adjust the image quality. A cycle for adjusting the image quality may be preconfigured before a device is delivered from a factory, or may be set by a user according to a requirement of the user. This is not limited herein. For example, the cycle for adjusting the image quality may be three months, or may be one month or half a year. This is not limited herein.

In some embodiments, the host may send the reference picture group to each display in the splicing display, or send the reference picture group to at least one display in the splicing display.

402: The splicing display sequentially displays the reference picture 1 and the reference picture 2 in the reference picture group in full screen.

For example, the splicing display sequentially displays the reference pictures in full screen in ascending order of sequence numbers of the reference pictures in the reference picture group. For example, the sequence number of the reference picture 1 is 1, the sequence number of the reference picture 2 is 2, and the splicing display first displays the reference picture 1 in full screen, and then displays the reference picture 2 in full screen. Certainly, it may be understood that in this embodiment of this application, the reference picture in the reference picture group may alternatively be displayed in another manner.

403: When the splicing display displays the reference picture 1 in full screen, a color analyzer photographs the entire display area of the splicing display at a fixed position to obtain a photo 1, and sends the photo 1 to the host. When the splicing display displays the reference picture 2 in full screen, the color analyzer photographs the entire display area of the splicing display at a fixed position to obtain a photo 2, and sends the photo 2 to the host.

For example, when the splicing display displays the reference picture 1 in full screen, the user operates the color analyzer at a fixed position, so that the color analyzer photographs the entire display area of the splicing display in response to the operation of the user, to obtain the photo 1. For example, when the splicing display displays the reference picture 2 in full screen, the user operates the color analyzer at a fixed position, so that the color analyzer photographs the entire display area of the splicing display in response to the operation of the user.

Alternatively, for another example, the host sends a photographing instruction to the color analyzer, and the color analyzer receives the photographing instruction, and photographs the entire display area of the splicing display at a fixed position at an interval of a first duration. It should be noted that the first duration may be a display interval between two adjacent reference pictures. Therefore, no user operation is required.

Alternatively, for another example, the host may send a photographing instruction to the color analyzer in response to the reference picture in the reference picture group displayed on the splicing display, and the color analyzer receives the photographing instruction and photographs the entire display area of the splicing display at a fixed position.

For example, the host sends a photographing instruction to the color analyzer in response to the reference picture 1 displayed on the splicing display. The color analyzer receives the photographing instruction, and photographs the entire display area of the splicing display at a fixed position, to obtain a photo of the entire display area of the splicing display when the splicing display displays the reference picture 1. The host sends a photographing instruction to the color analyzer in response to the reference picture 2 displayed on the splicing display. The color analyzer receives the photographing instruction, and photographs the entire display area of the splicing display at a fixed position, to obtain a photo of the entire display area of the splicing display when the splicing display displays the reference picture 2.

It should be noted that in this embodiment of this application, a manner of triggering the color analyzer to photograph the entire display area of the splicing display is not limited.

404: The host receives the photo 1, and generates an image quality adjustment parameter 1 of each display of the splicing display based on the photo 1 and the reference picture 1. The host receives the photo 2, and generates an image quality adjustment parameter 2 of each display of the splicing display based on the photo 2 and the reference picture 2.

405: The host sends a corresponding 3D-LUT color adjustment table to each display of the splicing display. Each display of the splicing display corresponds to one 3D-LUT color adjustment table. A 3D-LUT color adjustment table of a display is used as an example. The 3D-LUT color adjustment table of the display includes an image quality adjustment parameter 1 and an image quality adjustment parameter 2 of the display.

406: Each display of the splicing display receives the corresponding 3D-LUT color adjustment table and adjusts image quality based on an image quality adjustment parameter in the 3D-LUT color adjustment table. In this way, the splicing display can adjust image quality of a plurality of displays at a time, thereby helping improve adjustment efficiency.

Further, in some embodiments, the host may further send a plurality of reference picture groups to the splicing display in sequence. A quantity of pictures included in each reference picture group may be the same or may be different, and colors of the pictures included in each reference picture group may be partially the same, partially different, or completely different, so that the splicing display adjusts different image quality parameters. For example, the host may sequentially send a first reference picture group and a second reference picture group to the splicing display. The first reference picture group includes a standard red picture, a standard blue picture, a standard yellow picture, and a standard white picture. The second reference picture group includes a standard black picture and a standard green picture.

The following uses an example in which the host generates the image quality adjustment parameter 1 of the display 1, the image quality adjustment parameter 1 of the display 2, the image quality adjustment parameter 1 of the display 3, and the image quality adjustment parameter 1 of the display 4 based on the photo 1 and the reference picture 1 to correspondingly describe how the host generates the image quality adjustment parameter of the display.

First, the host divides the photo 1, based on display areas of displays in the splicing display, to obtain an image 1, an image 2, an image 3, and an image 4. The image 1 is an image displayed on the display 1, the image 2 is an image displayed on the display 2, the image 3 is an image displayed on the display 3, and the image 4 is an image displayed on the display 4. The image 1, the image 2, the image 3, and the image 4 form the photo 1.

Then, the host extracts a color value of each image block in the image 1, a color value of each block in the image 2, a color value of each block in the image 3, and a color value of each block in the image 4.

A color value of a block is used as an example. The color value of the block may be coordinates (L, a, b) of the block in a Lab color space, where L represents brightness of the block, a represents a red degree of the block, and b represents a blue degree of the block. The coordinates (L, a, b) in the Lab color space may be referred to as CIELab coordinates or Lab coordinates for short, and are a non-linear mapping of CIEXYZ coordinates, and have two properties: (1) visual averaging: in the Lab color space, a Euclidean distance between two colors is approximately linear to a color difference perceived by human eyes. (2) Value symmetry: A value of L of the CIELab coordinate is within [0, 100], and the values of a and b are within [−128, 128], which can be well normalized.

For example, one block includes 32×32 pixels, and each pixel includes four color channels RGBY, where R represents a red channel, G represents a green channel, B represents a blue channel, and Y represents a yellow channel.

Figure 5:
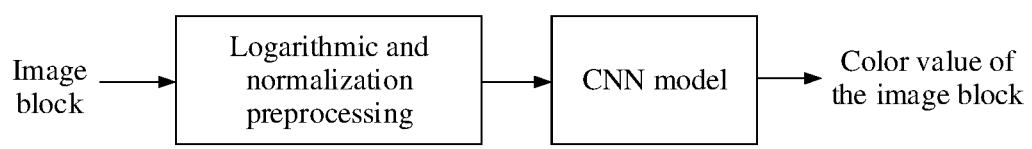
FIG. 5 is a schematic diagram of obtaining a color value of an image block according to an embodiment of this application.

In some embodiments, as shown in FIG. 5, the host may extract a color value of a block in the following manner:

The host performs logarithmic and normalization preprocessing on all pixels in the block, to obtain a preprocessing result. In this way, distribution of pixels in each channel can be easily observed, and the distribution is closer to symmetry. The preprocessing result is input into a convolutional neural network (CNN) model to obtain the color value of the block. For example, a structure of the CNN model in this example of this application may be a simplified version of a discriminator model in a Pix2pix model. The CNN model may include a convolutional layer+BatchNorm+ReLU layer with a kernel size of 3×3, a MaxPool (a sampling rate and a step size are 2), and an AveragePool (a sampling rate and a step size are 4).

The foregoing is only an example of extracting the color value of the block. In this embodiment of this application, the color value of the block may alternatively be extracted in another manner. This is not limited herein.

Further, the host determines a color value of the image 1 and color values of four boundaries of the image 1 based on the color value of each block in the image 1, determines a color value of the image 2 and color values of four boundaries of the image 2 based on the color value of each block in the image 2, determines a color value of the image 3 and color values of four boundaries of the image 3 based on the color value of each block in the image 3, and determines a color value of the image 4 and color values of four boundaries of the image 4 based on the color value of each block in the image 4.

A color value of an image is an average value of color values of all blocks in the image, and is used to represent an overall color of the image. A color value of a boundary of the image is an average value of color values of all blocks on this edge of the image, and is used to represent a color of the boundary of the image.

Then, the host adjusts the color value of the image 1, the color value of the image 2, the color value of the image 3, and the color value of the image 4 respectively based on the color value of the image 1, the color values of the four boundaries of the image 1, the color value of the image 2, the color values of the four boundaries of the image 2, the color value of the image 3, the color values of the four boundaries of the image 3, the color value of the image 4, and the color values of the four boundaries of the image 4, so that a difference between color values of two adjacent images is less than a threshold 1, a difference between color values of boundaries of two adjacent images is less than a threshold 2, and a difference between a color value of the entire display area of the splicing display and a color value of the reference picture 1 is less than a threshold 3.

The threshold 1, the threshold 2, and the threshold 3 may be preset according to an actual requirement, for example, 0.5≤threshold 1≤2.3, 0.5≤threshold 2≤2.3, and 0.5≤threshold 2≤2.3. Smaller values of the threshold 1, the threshold 2, and the threshold 3 indicate that human eyes cannot perceive color differences displayed on different displays.

For example, when a color value is a Lab coordinate, for example, a color value 1 is a Lab coordinate 1, and a color value 2 is a Lab coordinate 2, coordinates of Lab1 are ($L_1$, $a_1$, $b_1$), and coordinates of Lab2 are ($L_2$, $a_2$, $b_2$), and a difference $\Delta E_{12}$ between the color value 1 and the color value 2 may meet an expression 1:

$$\Delta E_{12} = \sqrt{(L_2 - L_1)^2 + (a_2 - a_1)^2 + (b_2 - b_1)^2} \qquad 1$$

Finally, the host generates the image quality adjustment parameter 1 of the display 1, the image quality adjustment parameter 1 of the display 2, the image quality adjustment parameter 1 of the display 3, and the image quality adjustment parameter 1 of the display 4 based on a color value of an adjusted image 1, a color value of an adjusted image 2, a color value of an adjusted image, and a color value of an adjusted image. The image quality adjustment parameter 1 of the display 1 is used as an example. The image quality adjustment parameter of the display 1 includes a reference RGB value and a target RGB value, the reference RGB value is an RGB value of a reference picture, and the target RGB value is obtained based on the color value of the adjusted image 1.

For example, the image 1 is used as an example. The host may transfer the color value of the adjusted image 1 from the Lab color space to an RGB color space, to obtain the target RGB value. For example, the host may first convert the color value of the adjusted image 1 (that is, the Lab coordinates of the image 1) into coordinates (x1, y1, z1) in a XYZ color space, and then obtain, through interpolation calculation based on (x1, y1, z1), RGB coordinates corresponding to (x1, y1, z1) in the RGB color space, that is, the target RGB value.

Further, in some embodiments, the host may adjust the color value of the image 1, the color value of the image 2, the color value of the image 3, and the color value of the image 4 in the following manner, so that the difference between color values of two adjacent images is less than the threshold 1, the difference between color values of boundaries of two adjacent images is less than the threshold 2, and the difference between the color value of the entire display area of the splicing display and the color value of the reference picture 1 is less than the threshold 3:

Step 1: The host determines a first target image from the image 1, the image 2, the image 3, and the image 4 based on the color value of the image 1, the color value of the image 2, the color value of the image 3, and the color value of the image 4, where a difference between the color value of the first target image and the color value of the reference picture is the smallest.

Step 2: The host determines whether an image adjacent to the first target image in the image 1, the image 2, the image 3, and the image 4 meets a determining condition, performs step 4 if the image meets the determining condition, and performs step 3 if the image does not meet the determining condition.

For example, the first target image is an image displayed on the display 2, and images adjacent to the first target image are the image 1 (an image displayed on the display 1) and the image 4 (an image displayed on the display 4). The host determines whether the image 1 and the image 4 meet the determining condition. If both the image 1 and the image 4 meet the determining condition, step 4 is performed. If the image 1 and/or the image 4 do/does not meet the determining condition, step 3 is performed.

The image 1 is used as an example. The host may determine, in the following manner, whether image 1 meets the determining condition:

When the difference between the color value of the image 1 and the color value of the image 2 is less than the threshold 1, and the difference between the color values of the boundaries between the image 1 and the image 2 is less than the threshold 2, the host determines that the image 1 meets the determining condition; when the difference between the color value of the image 1 and the color value of the image 2 is greater than or equal to the threshold 1, and/or the difference between the color values of the boundaries between the image 1 and the image 2 is greater than or equal to the threshold 2, the host determines that the image 1 does not meet the determining condition.

Step 3: The host adjusts, based on a target step size, a color value of an image that does not meet the determining condition and that is adjacent to the first target image, and then performs step 1 again.

For example, the image 1 is used as an example. For example, the color value of the image 1 is (L1, a1, b1), and the target step size may be 1. The host may add 1 to or subtract 1 from a1, and add 1 to or subtract 1 from b1, where a1 is from −500 to 500, including −500 and 500, and b1 is from −200 to 200, including −200 and 200. It should be noted that, in this embodiment of this application, the target step size may be preset according to an actual requirement, and may be 1, 2, or the like. This is not limited herein.

Step 4: The host determines a second target image from the image 1, the image 2, the image 3, and the image 4, where the second target image is an image that is in images other than the first target image and that has a minimum difference with a color value of the reference picture.

Step 5: The host determines whether an image adjacent to the second target image in the image 1, the image 2, the image 3, and the image 4 meets a determining condition, performs step 7 if the image meets the determining condition, and performs step 6 if the image does not meet the determining condition.

Step 6: The host adjusts, based on the target step size, a color value of an image that does not meet the determining condition and that is adjacent to the second target image, and then performs step 1 again.

Step 7: If determining that the image 1, the image 2, the image 3, and the image 4 all meet the determining condition, the host determines a color value of the entire display area of the splicing display, where the color value of the entire display area of the splicing display is an average value of the color value of the image 1, the color value of the image 2, the color value of the image 3, and the color value of the image 4.

Step 8: When the difference between the color value of the entire display area of the splicing display and the color value of the reference picture 1 is less than the threshold 3, the host stops adjusting the color value of the image 1, the color value of the image 2, the color value of the image 3, and the color value of the image 4.

In some other embodiments, when the difference between the color value of the entire display area of the splicing display and the color value of the reference picture 1 is greater than or equal to the threshold 3, a color value of an image with a minimum difference between a color value of an image in the image 1, the image 2, the image 3, and the image 4 and the color value of the reference picture is adjusted based on the target step size. Then, step 1 is performed again until the difference between the color value of the entire display area of the splicing display and the color value of the reference picture 1 is less than the threshold 3.

For example, an image with a minimum difference between a color value of an image in the image 1, the image 2, the image 3, and the image 4 and the color value of the reference picture is the image 2. For example, the color value of the image 2 is (L2, a2, b2), and the target step size may be 1. The host may add 1 to or subtract 1 from a2, and add 1 to or subtract 1 from b2, where a2 is from −500 to 500, including −500 and 500, and b2 is from −200 to 200, including −200 and 200. It should be noted that, in this embodiment of this application, the target step size may be preset according to an actual requirement, and may be 1, 2, or the like. This is not limited herein.

The foregoing adjustment manner helps improve display effect of the splicing display, thereby improving user experience. It should be noted that the foregoing is merely an example of a manner of adjusting the color value of the image, and is not intended to limit this embodiment of this application. In this embodiment of this application, the host may further adjust the color value of the image in another manner. This is not limited herein.

Figure 6:
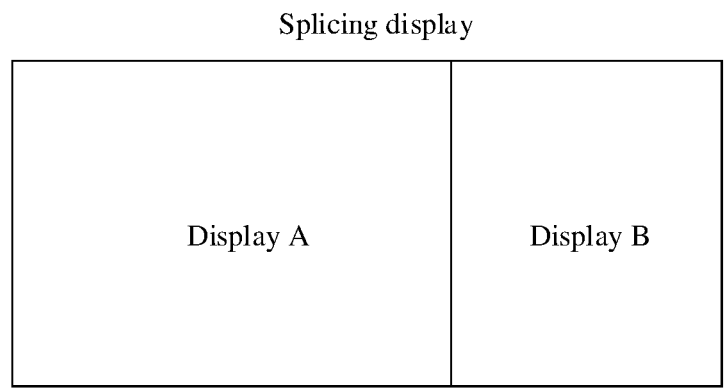
FIG. 6 is a schematic diagram of another splicing display according to an embodiment of this application.

The foregoing uses the splicing display shown in FIG. 1 only as an example for description. It should be noted that, in this embodiment of this application, sizes of displays used to form the splicing display may be the same or may be different. In addition, a splicing manner of the displays is not limited in this embodiment of this application. For example, as shown in FIG. 6, the splicing display includes a display A and a display B. Certainly, in this embodiment of this application, a brand, a batch, a model, a material, and the like of each display in the splicing display are not limited.

It should be understood that FIG. 4 describes the image quality adjustment method by using an example in which a color of each display used to form a splicing display is adjusted. In addition, in this embodiment of this application, the method shown in FIG. 4 may be further extended to adjustment of color accuracy, saturation, brightness, contrast, and the like of each display in the splicing display, and is implemented by replacing a reference picture in FIG. 4 with a reference picture of a corresponding reference, such as a gray scale, a stripe, and three primary colors.

The foregoing embodiments may be used separately, or may be used in combination with each other. This is not limited.

Figure 7:
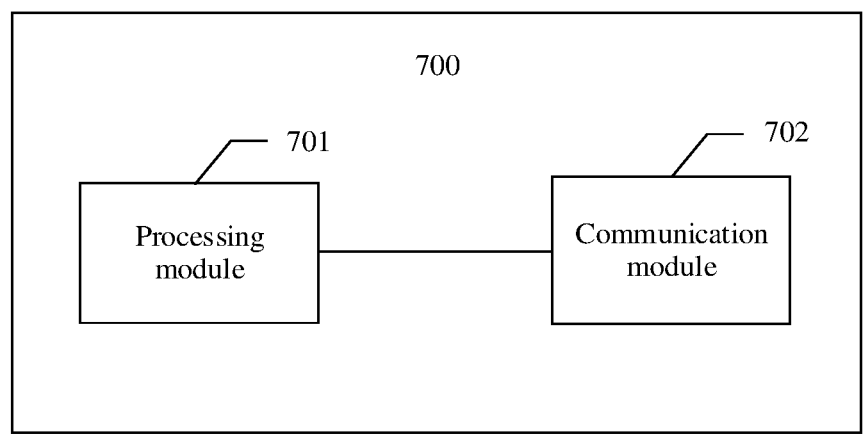
FIG. 7 is a schematic diagram of a structure of an apparatus according to an embodiment of this application.

Based on a same concept, an embodiment of this application further provides an apparatus 700. As shown in FIG. 7, the apparatus 700 includes a processing module 701 and a communication module 702.

In an example, the apparatus 700 is configured to implement functions of the host in the method shown in FIG. 4. The apparatus 700 may be an electronic device separated from a splicing display, or may be an apparatus integrated into a splicing display. For example, the apparatus 700 may be a chip system. In this embodiment of this application, the chip system may include a chip, or may include a chip and another discrete component.

For example, the processing module 701 is configured to generate an image quality adjustment parameter of each display in a splicing display based on a reference picture and a photo. The communication module 702 is configured to send a reference picture to the splicing display, receive a photo, and the like.

For specific execution processes of the processing module 701 and the communication module 702, refer to the descriptions in the foregoing method embodiment. Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 8:
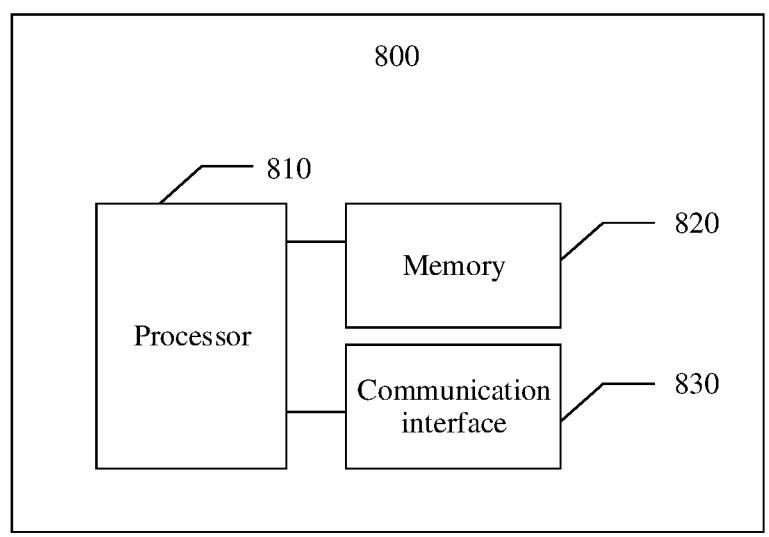
FIG. 8 is a schematic diagram of a structure of another apparatus according to an embodiment of this application.

Same as the foregoing concept, as shown in FIG. 8, an embodiment of this application further provides an apparatus 800, including a processor 810, configured to implement functions of the host in the foregoing method. For example, the processor 810 may be configured to generate an image quality adjustment parameter of each display in a splicing display based on a reference picture and a photo. For details, refer to the detailed descriptions in the method. Details are not described herein again.

In some embodiments, the apparatus 800 may further include a memory 820, configured to store a computer program and/or data. The computer program includes instructions. The memory 820 is coupled to the processor 810. Couplings in this embodiment of this application are indirect couplings or communication connections between apparatuses, units, or modules, may be implemented in an electrical form, a mechanical form, or another form, and are used for information exchange between the apparatuses, the units, or the modules. In another implementation, the memory 810 may alternatively be located outside the apparatus 800. The processor 810 may collaborate with the memory 820. The processor 810 may execute the instructions stored in the memory 820. Alternatively, the memory 820 may be included in the processor 810.

In some embodiments, the apparatus 800 may further include a communication interface 830, configured to communicate with another device through a transmission medium, so that an apparatus in the apparatus 800 may communicate with the another device or apparatus. For example, the communication interface 830 may be a transceiver, a circuit, a bus, a module, or a communication interface of another type, and the another device or apparatus may be a splicing display or a color analyzer. The processor 810 sends and receives information such as a photo or a reference picture through the communication interface 830, and is configured to implement the methods in the foregoing embodiments. For example, the communication interface 830 may be configured to send a reference picture, receive a photo, and the like.

In this embodiment of this application, a connection medium among the communication interface 830, the processor 810, and the memory 820 is not limited. For example, in this embodiment of this application, the memory 820, the processor 810, and the communication interface 830 may be connected through a bus in FIG. 8. The bus may be classified into an address bus, a data bus, a control bus, or the like.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, such as a hard disk drive (HDD) or a solid-state drive (SSD), or may be a volatile memory, such as a random-access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid state disk Solid State Disk (SSD)), or the like. In a case in which no conflict occurs, the solutions in the foregoing embodiments may be combined for use.

What is claimed is:

1. A method, comprising:
   receiving a first event, wherein the first event triggers image quality adjustment of a splicing display, and the splicing display is obtained by combining at least a first display and a second display;
   sending N reference pictures to the splicing display in response to the first event, wherein the N reference pictures comprise a first reference picture, and N is a positive integer greater than or equal to 1;
   receiving a first photo, wherein the first photo is obtained by photographing an entire display area of the splicing display when the splicing display displays the first reference picture in full screen as a whole; and
   generating a first image quality adjustment parameter and a second image quality adjustment parameter based on the first reference picture and the first photo, wherein the first image quality adjustment parameter is configured to be used to adjust image quality of the first display, and the second image quality adjustment parameter is configured to be used to adjust image quality of the second display.

2. The method according to claim 1, wherein generating the first image quality adjustment parameter and the second image quality adjustment parameter based on the first reference picture and the first photo comprises:
   dividing the first photo into a first image and a second image, wherein the first image is displayed on the first display when the splicing display displays the first reference picture in full screen as a whole, and the second image is displayed on the second display when the splicing display displays the first reference picture in full screen as a whole;
   determining a first image color value, a second image color value, a first boundary color value, and a second boundary color value, wherein the first image color value indicates an overall color of the first image, the second image color value indicates an overall color of the second image, the first boundary color value indicates a color value of a first boundary in the first image, the second boundary color value indicates a color value of a second boundary in the second image, and the first boundary and the second boundary are adjacent boundaries of the first image and the second image;
   adjusting the first image color value and the second image color value based on the first image color value, the second image color value, the first boundary color value, and the second boundary color value, to obtain an adjusted first image color value and an adjusted second image color value, wherein a difference between the adjusted first image color value and the adjusted second image color value is less than a first threshold, a difference between color values of the adjacent boundaries of the first image and the second image is less than a second threshold, and a difference between a color value of the entire display area of the splicing display and a color value of the first reference picture is less than a third threshold; and
   obtaining the first image quality adjustment parameter based on the color value of the first reference picture and the adjusted first image color value, and obtaining the second image quality adjustment parameter based on the color value of the first reference picture and the adjusted second image color value.

3. The method according to claim 2, wherein the first image quality adjustment parameter comprises a Red Green Blue (RGB) value of the first reference picture and a first target RGB value, the first target RGB value is obtained based on the adjusted first image color value, the second image quality adjustment parameter comprises the RGB value of the first reference picture and a second target RGB value, and the second target RGB value is obtained based on the adjusted second image color value.

4. The method according to claim 2, wherein the first image color value is an average value of color values of all image blocks in the first image, the second image color value is an average value of color values of all image blocks in the second image, the first boundary color value is an average value of color values of all image blocks on the first boundary, and the second boundary color value is an average value of color values of all image blocks on the second boundary.

5. The method according to claim 2, wherein adjusting the first image color value and the second image color value based on the first image color value, the second image color value, the first boundary color value, and the second boundary color value, to obtain the adjusted first image color value and the adjusted second image color value, comprises:
performing an adjustment by:
when the first image color value is less than the second image color value, determining whether a difference between the second image color value and the first image color value is less than the first threshold, and determining whether a difference between the second boundary color value and the first boundary color value is less than the second threshold;
when the difference between the second image color value and the first image color value is less than the first threshold, and the difference between the second boundary color value and the first boundary color value is less than the second threshold, determining whether the difference between the color value of the entire display area of the splicing display and the color value of the first reference picture is less than the third threshold; and
when the difference between the color value of the entire display area of the splicing display and the color value of the first reference picture is not less than the third threshold, adjusting the first image color value based on a first step size; and
re-executing performing the adjustment, until the difference between the color value of the entire display area of the splicing display and the color value of the first reference picture is less than the third threshold.

6. The method according to claim 5, further comprising:
when the difference between the second image color value and the first image color value is not less than the first threshold, or the difference between the second boundary color value and the first boundary color value is not less than the second threshold, adjusting the second image color value based on a second step size, and re-executing the selecting the smaller value in the first image color value and the second image color value, and re-executing performing the adjustment.

7. The method according to claim 1, further comprising:
sending the first image quality adjustment parameter to the first display, wherein the first display adjusts image quality based on the first image quality adjustment parameter; and sending the second image quality adjustment parameter to the second display, wherein the second display adjusts image quality based on the second image quality adjustment parameter.

8. The method according to claim 1, wherein N is 64 or 125.

9. The method according to claim 1, wherein the first reference picture is a standard-color picture or a standard-color-gradation picture.

10. The method according to claim 1, wherein the first event is a first startup operation, an image quality adjustment operation, or arrival of an image quality adjustment moment.

11. An apparatus, comprising:
at least one processor; and
a non-transitory computer readable storage medium storing a program that is executable by the at least one processor, the program including instructions to:
receive a first event, wherein the first event triggers image quality adjustment of a splicing display, and the splicing display is obtained by combining at least a first display and a second display;
in response to receiving the first event, send N reference pictures to the splicing display, wherein the N reference pictures comprise a first reference picture, and N is a positive integer greater than or equal to 1;
receive a first photo, wherein the first photo is obtained by photographing an entire display area of the splicing display when the splicing display displays the first reference picture in full screen as a whole; and
generate a first image quality adjustment parameter and a second image quality adjustment parameter based on the first reference picture and the first photo, wherein the first image quality adjustment parameter is configured to be used to adjust image quality of the first display, and the second image quality adjustment parameter is configured to be used to adjust image quality of the second display.

12. The apparatus according to claim 11, wherein the program further includes instructions to:
divide the first photo into a first image and a second image, wherein the first image is displayed on the first display when the splicing display displays the first reference picture in full screen as a whole, and the second image is displayed on the second display when the splicing display displays the first reference picture in full screen as a whole;
determine a first image color value, a second image color value, a first boundary color value, and a second boundary color value, wherein the first image color value indicates an overall color of the first image, the second image color value indicates an overall color of the second image, the first boundary color value indicates a color value of a first boundary in the first image, the second boundary color value indicates a color value of a second boundary in the second image, and the first boundary and the second boundary are adjacent boundaries of the first image and the second image;
adjust the first image color value and the second image color value based on the first image color value, the second image color value, the first boundary color value, and the second boundary color value, to obtain an adjusted first image color value and an adjusted second image color value, wherein a difference between the adjusted first image color value and the adjusted second image color value is less than a first threshold, a difference between color values of the adjacent boundaries of the first image and the second image is less than a second threshold, and a difference between a color value of the entire display area of the splicing display and a color value of the first reference picture is less than a third threshold; and obtain the first image quality adjustment parameter based on the color value of the first reference picture and the adjusted first image color value, and obtain the second image quality adjustment parameter based on the color value of the first reference picture and the adjusted second image color value.

13. The apparatus according to claim 12, wherein the first image quality adjustment parameter comprises a Red Green Blue (RGB) value of the first reference picture and a first target RGB value, and the first target RGB value is obtained based on the adjusted first image color value; and the second image quality adjustment parameter comprises the RGB value of the first reference picture and a second target RGB value, and the second target RGB value is obtained based on the adjusted second image color value.

14. The apparatus according to claim 12, wherein the first image color value is an average value of color values of all image blocks in the first image, the second image color value is an average value of color values of all image blocks in the second image, the first boundary color value is an average value of color values of all image blocks on the first boundary, and the second boundary color value is an average value of color values of all image blocks on the second boundary.

15. The apparatus according to claim 12, wherein the program further includes instructions to:
   perform an adjustment by:
      when the first image color value is less than the second image color value, determine whether a difference between the second image color value and the first image color value is less than the first threshold, and determine whether a difference between the second boundary color value and the first boundary color value is less than the second threshold;
      when the difference between the second image color value and the first image color value is less than the first threshold, and the difference between the second boundary color value and the first boundary color value is less than the second threshold, determine whether the difference between the color value of the entire display area of the splicing display and the color value of the first reference picture is less than the third threshold; and
      when the difference between the color value of the entire display area of the splicing display and the color value of the first reference picture is not less than the third threshold, adjust the first image color value based on a first step size, and re-executing performing the adjustment, until the difference between the color value of the entire display area of the splicing display and the color value of the first reference picture is less than the third threshold.

16. The apparatus according to claim 15, wherein the program further includes instructions to:
   when the difference between the second image color value and the first image color value is not less than the first threshold, or the difference between the second boundary color value and the first boundary color value is not less than the second threshold, adjust the second image color value based on a second step size, and re-execute the selecting the smaller value in the first image color value and the second image color value, and re-execute performing the adjustment.

17. The apparatus according to claim 11, wherein the program further includes instructions to:
   send the first image quality adjustment parameter to the first display, wherein the first display adjusts image quality based on the first image quality adjustment parameter; and
   send the second image quality adjustment parameter to the second display, wherein the second display adjusts image quality based on the second image quality adjustment parameter.

18. The apparatus according to claim 11, wherein the first reference picture is a standard-color picture or a standard-color-gradation picture.

19. The apparatus according to claim 11, wherein the first event is a first startup operation, an image quality adjustment operation, or arrival of an image quality adjustment moment.

20. The apparatus according to claim 11, wherein the apparatus is a device separated from the splicing display, or the apparatus is a chip integrated on the splicing display.

* * * * *